United States Patent
Isokawa

(10) Patent No.: US 10,616,436 B2
(45) Date of Patent: Apr. 7, 2020

(54) IMAGE READING APPARATUS AND IMAGE FORMING SYSTEM, INCLUDING OPPOSING PART

(71) Applicant: Konica Minolta, Inc., Chiyoda-ku, Tokyo (JP)

(72) Inventor: Hiroshi Isokawa, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/907,437

(22) Filed: Feb. 28, 2018

(65) Prior Publication Data
US 2018/0270386 A1  Sep. 20, 2018

(30) Foreign Application Priority Data

Mar. 16, 2017 (JP) .................................. 2017-051675

(51) Int. Cl.
*H04N 1/028* (2006.01)
*H04N 1/00* (2006.01)

(52) U.S. Cl.
CPC ........ *H04N 1/02895* (2013.01); *H04N 1/0066* (2013.01); *H04N 1/00737* (2013.01); *H04N 1/00779* (2013.01); *H04N 1/00909* (2013.01); *H04N 1/00952* (2013.01)

(58) Field of Classification Search
CPC ............. H04N 1/02895; H04N 1/0066; H04N 1/00737; H04N 1/00779; H04N 1/00909; H04N 1/00952
See application file for complete search history.

(56) References Cited

U.S. PATENT DOCUMENTS

| 2006/0001980 A1* | 1/2006 | Namba .............. G03G 15/0409 359/649 |
| 2012/0099884 A1* | 4/2012 | Nakaie .............. G03G 15/5062 399/74 |
| 2014/0168722 A1 | 6/2014 | Mitamura |
| 2015/0271351 A1* | 9/2015 | Matsuzaki ......... H04N 1/00779 358/1.5 |
| 2018/0020108 A1* | 1/2018 | Nakayama ............. B65H 5/068 |

FOREIGN PATENT DOCUMENTS

| JP | 11-072975 A | 3/1999 |
| JP | 2013-038789 A | 2/2013 |
| JP | 2014-120978 A | 6/2014 |
| JP | 2018-011154 A | 1/2018 |

OTHER PUBLICATIONS

Office Action (Notice of Reasons for Refusal) dated Oct. 1, 2019, by the Japanese Patent Office in corresponding Japanese Patent Application No. 2017-051675 and an English Translation of the Office Action. (21 pages).

* cited by examiner

Primary Examiner — Iriana Cruz
(74) Attorney, Agent, or Firm — Buchanan Ingersoll & Rooney PC

(57) ABSTRACT

An image reading apparatus includes a reader, a transmitter, an opposing part that is placed opposite to the transmitter, and a hardware processor that controls a position of the opposing part such that a gap between the transmitter and the opposing part becomes a first gap when images are read by the reader, and a gap between the transmitter and the opposing part becomes a second gap, which is wider than the first gap, when no image is read by the reader.

12 Claims, 6 Drawing Sheets

IMAGE READING APPARATUS AND IMAGE FORMING SYSTEM, INCLUDING OPPOSING PART

CROSS REFERENCE TO RELATED APPLICATIONS

The entire disclosure of Japanese patent Application No. 2017-051675, filed on Mar. 16, 2017, is incorporated herein by reference in its entirety.

BACKGROUND

Technological Field

The present invention relates to an image reading apparatus and an image forming system.

Description of Related Art

Image forming apparatuses utilizing electrophotographic process technology (printers, copiers, facsimile machines, for example) typically form electrostatic latent images by irradiating charged image bearing members, such as photoconductor drums, with laser beams on the basis of image data. Toner images are then formed by supplying toners from a developing device to the image bearing members, on which the electrostatic latent images have been formed, so as to visualize the electrostatic latent images. Further, the toner images are transferred to sheets directly or indirectly, and then fixed through heating and pressing by a fixing nip, thereby forming toner images on the sheets.

Efforts have been made for practical use of an image forming system in which an image forming apparatus described above is connected with an image reading apparatus that reads images formed on sheets and feeds back the read information to the image forming apparatus such that colors, positions, and magnifications, for example, of the images are set to be correct values.

A transmission section, such as glass that can transmit light for reading images, is provided so as to be placed facing a reading section of the image reading apparatus. Since such a transmission section faces sheets being conveyed, paper power and dust of the sheets, for example, are attached to the transmission section. Accordingly, the transmission section needs to be cleaned.

Japanese Patent Application Laid-Open No. H11-72975, for example, discloses a configuration in which a rail for guiding a cleaning member is provided in the longitudinal direction of a transmission section such that the cleaning member is movable on the rail. In this configuration, the transmission section can be cleaned by moving the cleaning member along the rail.

SUMMARY

In order to clean a transmission section, a cleaning member is entered into a sheet feeding path corresponding to the transmission section, as in the configuration described in Japanese Patent Application Laid-Open No. H11-72975. Accordingly, it is desirable to secure a certain gap in the sheet feeding path corresponding to the transmission section.

In order to ensure reading accuracy in a reading section, however, it is required to prevent fluctuations in sheet height in the reading position.

In the configuration described in Japanese Patent Application Laid-Open No. H11-72975, a rail on which a cleaning member moves is provided, and thus a wide gap in the sheet feeding path corresponding to the transmission section is secured. Accordingly, such a configuration has certain limitations in view of reading accuracy in a reading section.

An object of the present invention is to provide an image reading apparatus and an image forming system that can clean a transmission section provided facing a reading section while ensuring reading accuracy by the reading section.

To achieve at least one of the abovementioned objects, an image reading apparatus reflecting one aspect of the present invention includes:

a reading section that reads an image formed on a sheet being conveyed along a sheet feeding path;

a transmission section that is provided facing the reading section and the sheet feeding path, and that transmits light;

an opposing part that is placed opposite to the transmission section via the sheet feeding path and that includes a first-gap forming section which forms a first gap with the transmission section and a second gap-forming section which forms a second gap with the transmission section, in which the second gap is larger than the first gap, and the opposing part is held movable at a fixed height position relative to the transmission section such that a portion opposite to the transmission section is switched between the first gap-forming section and the second gap-forming section; and a hardware processor that controls a position of the opposing part such that a gap between the transmission section and the opposing part becomes the first gap when the image is read by the reading section, and a gap between the transmission section and the opposing part becomes the second gap when the image is not read by the reading section.

To achieve at least one of the abovementioned objects, an image forming system reflecting one aspect of the present invention includes:

a reading section that reads an image formed on a sheet being conveyed along a sheet feeding path;

a transmission section that is provided facing the reading section and the sheet feeding path, and that transmits light;

an opposing part that is placed opposite to the transmission section via the sheet feeding path and that includes a first gap-forming section which forms a first gap with the transmission section and a second gap-forming section which forms a second gap with the transmission section, in which the second gap is larger than the first gap, and the opposing part is held movable at a fixed height position relative to the transmission section such that a portion opposite to the transmission section is switched between the first gap-forming section and the second gap-forming section; and a hardware processor that controls a position of the opposing part such that a gap between the transmission section and the opposing part becomes the first gap when the image is read by the reading section, and a gap between the transmission section and the opposing part becomes the second gap when the image is not read by the reading section.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
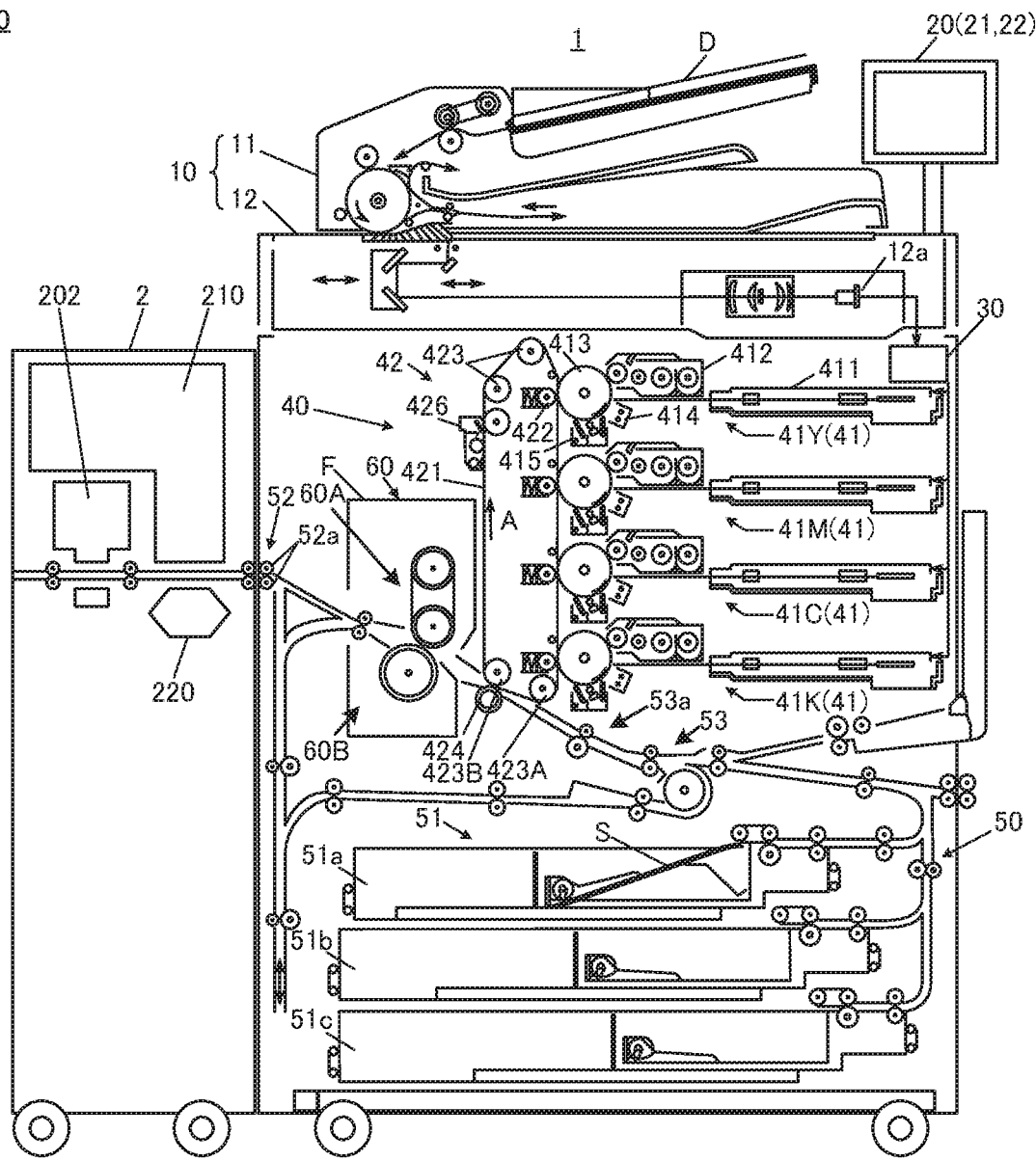
FIG. 1 schematically illustrates the entire configuration of an image forming system of an embodiment.
Figure 2:
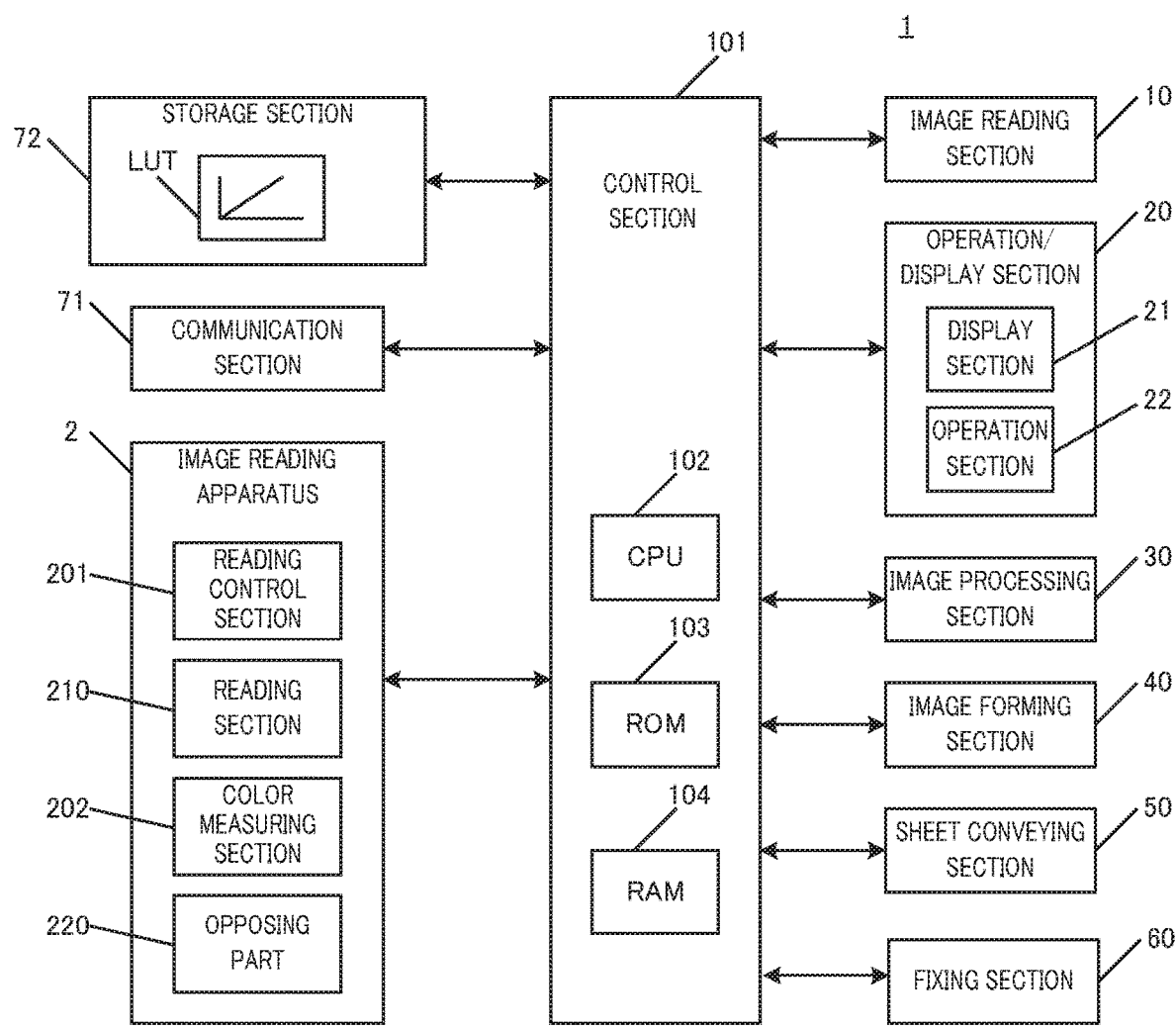
FIG. 2 shows the main part of a control system of an image forming apparatus of the image forming system according to the embodiment.

In the following, the embodiments will be described in detail with reference to the drawings. FIG. 1 schematically illustrates the entire configuration of image forming system 100 of the embodiment. FIG. 2 shows the main part of a control system of image forming apparatus 1 of image forming system 100 according to the embodiment.

As illustrated in FIG. 1, image forming system 100 includes image forming apparatus 1 and image reading apparatus 2 connected in this order from the upstream side in the conveying direction of sheet S.

Image forming apparatus 1 is an intermediate transfer-mode color image forming apparatus utilizing electrophotographic process technology. Image forming apparatus 1 transfers color toner images of yellow (Y), magenta (M), cyan (C), and black (K) formed on photoconductor drums 413 to intermediate transfer belt 421 to superimpose the four color toner images on intermediate transfer belt 421 (primary transfer), and then transfers sheet S sent out from sheet feeding tray units 51a to 51c to form an image (secondary transfer).

Image forming apparatus 1 employs a tandem mode in which photoconductor drums 413 corresponding to YMCK four colors are arranged in series in the running direction of intermediate transfer belt 421, and respective color toner images are successively transferred to intermediate transfer belt 421 in a single procedure.

As shown in FIG. 2, image forming apparatus 1 includes image reading section 10, operation/display section 20, image processing section 30, image forming section 40, sheet conveying section 50, fixing section 60, and control section 101.

Control section 101 of image forming apparatus 1 includes central processing unit (CPU) 102, read only memory (ROM) 103, and random access memory (RAM) 104, for example. CPU 102 reads a program corresponding to processing details from ROM 103, loads the program into RAM 104, and performs, cooperatively with the loaded program, centralized control of the operations in respective blocks of image forming apparatus 1. During this step, various data stored in storage section 72 are referred to. Storage section 72 is composed of, for example, a nonvolatile semiconductor memory (so-called flash memory) and/or a hard disk drive. Reading control section 201 of image reading apparatus 2 described hereinafter is also connected to control section 101.

Control section 101 transmits and receives various data to and from an external apparatus (personal computer, for example) connected to a communication network, such as a local area network (LAN) or a wide area network (WAN), via communication section 71. Control section 101, for example, receives image data transmitted from an external apparatus, and causes an image to be formed on sheet S on the basis of the image data (input image data). Communication section 71 is composed of, for example, a network interface card, such as a LAN adapter.

As illustrated in FIG. 1, image reading section 10 includes auto document feeder (ADF) 11 and document image scanner 12, for example.

Auto document feeder 11 conveys, by a conveying mechanism, document D placed on a document tray and sends it out to document image scanner 12. Auto document feeder 11 can continuously and simultaneously read images on numerous documents D placed on a document tray (both sides included).

Document image scanner 12 optically scans documents conveyed from auto document feeder 11 onto a contact glass or documents placed on a contract glass, and images reflected light from the documents on a light receiving surface of charge coupled device (CCD) sensor 12a to read document images Image reading section 10 generates input image data based on results read by document image scanner 12. The input image data undergoes predetermined image processing in image processing section 30.

As shown in FIG. 2, operation/display section 20 is composed of, for example, a touch panel-type liquid crystal display (LCD), and functions as both display section 21 and operation section 22. Display section 21 displays, for example, various operation screens, the state of images, the operation status of each function in accordance with display control signals input from control section 101. Operation section 22 equipped with various operation keys, such as a numeric keypad and a start key, receives various input operations by a user and outputs operation signals to control section 101.

Image processing section 30 includes, for example, a circuit that performs digital image processing of input image data in accordance with default settings or user settings. For example, image processing section 30 performs tone correction based on tone correction data (tone correction table) under the control of control section 101.

Moreover, image processing section 30 performs, for example, various correction processing, such as color correction or shading correction, in addition to tone correction, and/or compression processing of input image data. Image forming section 40 is controlled on the basis of the thus-processed image data.

As illustrated in FIG. 1, image forming section 40 includes, for example, intermediate transfer unit 42 and image forming units 41Y, 41M, 41C, and 41K for forming images of color toners of Y component, M component, C component, and K component, based on input image data.

Image forming units 41Y, 41M, 41C, and 41K for Y component, M component, C component, and K component have similar configurations. For the purpose of convenience in illustration and description, common components are denoted by the same numerals while the numerals are accompanied by Y, M, C, or K when they are distinguished from each other. In FIG. 1, only components of image forming unit 41Y for Y component are denoted by numerals, and numerals are omitted for components of other image forming units 41M, 41C, and 41K.

Image forming unit 41 includes exposing device 411, developing device 412, photoconductor drum 413, charging device 414, and drum cleaning device 415, for example.

Photoconductor drum 413 is, for example, a negative-charging organic photoconductor (OPC) formed by successively stacking an undercoat layer (UCL), a charge generation layer (CGL), and a charge transport layer (CTL) on a peripheral surface of an aluminum conductive cylinder (aluminum tube).

Control section 101 causes photoconductor drum 413 to rotate at a constant peripheral speed by controlling driving current supplied to a driving motor (not shown) for rotating photoconductor drum 413.

Charging device 414 evenly and negatively charges the surface of photoconductor drum 413. Exposing device 411 is composed of a semiconductor laser, for example, and irradiates photoconductor drum 413 with laser beams corresponding to images of respective color components.

Developing device 412 is, for example, a developing device of a two-component developing system, and forms a toner image by attaching a toner of each color component to the surface of photoconductor drum 413 to visualize an electrostatic latent image.

Drum cleaning device 415 includes, for example, a drum cleaning blade to be slid on the surface of photoconductor drum 413, and removes transfer residual toner remaining on the surface of photoconductor drum 413 after primary transfer.

Intermediate transfer unit 42 includes intermediate transfer belt 421, primary transfer roller 422, a plurality of support rollers 423, secondary transfer roller 424, and belt cleaning device 426, for example.

Intermediate transfer belt 421 is formed of an endless belt, and looped around a plurality of support rollers 423 under tension. At least one of a plurality of support rollers 423 is a driving roller, and the rest are driven rollers. For example, roller 423A disposed on the downstream side of primary transfer roller 422 for K component in the running direction of the belt is preferably a driving roller. Such a configuration facilitates the retention of a constant running speed of the belt in a primary transfer section. Intermediate transfer belt 421 runs in arrow A direction at a constant speed by the rotation of driving roller 423A.

Intermediate transfer belt 421 is a conductive elastic belt, and is rotated and driven by control signals from control section 101.

Primary transfer roller 422 is disposed, on the side of an inner peripheral surface of intermediate transfer belt 421, so as to face photoconductor drum 413 of each color component. A primary transfer nip, for transferring a toner image to intermediate transfer belt 421 from photoconductor drum 413, is formed by firmly pressing primary transfer roller 422 against photoconductor drum 413 via intermediate transfer belt 421.

Secondary transfer roller 424 is disposed, on the side of an outer peripheral surface of intermediate transfer belt 421, so as to face backup roller 423B that is disposed on the downstream side of driving roller 423A in the running direction of the belt. A secondary transfer nip, for transferring a toner image to sheet S from intermediate transfer belt 421, is formed by firmly pressing secondary transfer roller 424 against backup roller 423B via intermediate transfer belt 421.

When intermediate transfer belt 421 passes through the primary transfer nips, toner images on photoconductor drums 413 are successively superimposed and transferred to intermediate transfer belt 421 (primary transfer). Subsequently, when sheet S passes through the secondary transfer nip, toner images on intermediate transfer belt 421 are transferred to sheet S (secondary transfer). Sheet S bearing the transferred toner images is then conveyed to fixing section 60.

Belt cleaning device 426 removes transfer residual toner remaining on the surface of intermediate transfer belt 421 after secondary transfer.

Fixing section 60 includes, for example, upper fixing section 60A equipped with a fixing surface-side member that is disposed on the side of the fixing surface, i.e., the toner image-formed surface of sheet S, and lower fixing section 60B equipped with a rear surface-side support member that is disposed on the side of the rear surface, i.e., the surface opposite to the fixing surface of sheet S. A fixing nip, for pinching and conveying sheet S, is formed by firmly pressing the rear surface-side support member against the fixing surface-side member.

Fixing section 60 heats and presses conveyed sheet S in which toner images have been transferred (secondary transfer), thereby fixing the toner images on sheet S. Fixing section 60 is disposed, as a unit, inside fixing device F.

Sheet conveying section 50 includes sheet feeding section 51, sheet ejection section 52, and conveying path section 53, for example. Three sheet feeding tray units 51a to 51c, which constitute sheet feeding section 51, store sheets S (standard paper, special paper) classified based on basis weight and/or size, for example, in accordance with predetermined types. Conveying path section 53 includes a plurality of conveyance roller pairs, such as registration roller pair 53a.

Sheets S stored in sheet feeding tray units 51a to 51c are each sent out from the uppermost portion one by one and conveyed to image forming section 40 through conveying path section 53. In image forming section 40, toner images on intermediate transfer belt 421 are collectively transferred to an either surface of sheet S (secondary transfer), and undergoes a fixing process in fixing section 60. Sheet S bearing a formed image is ejected outside the apparatus by sheet ejection section 52 equipped with conveyance roller pair (ejection roller pair) 52a.

Image reading apparatus 2 is an apparatus that reads images formed on sheets S ejected from image forming apparatus 1, and includes reading control section 201, color measuring section 202, reading section 210, and opposing part 220.

Reading control section 201 feeds back information received from reading section 210 and/or color measuring section 202 to control section 101 of image forming apparatus 1. Control section 101 of image forming apparatus 1 performs image correction such that colors, positions, and magnifications, for example, of images are set to be correct values, on the basis of the information fed back by reading control section 201 of image reading apparatus 2.

Color measuring section 202 is a spectrophotometer, for example, and is configured to read the color, brightness, and chroma of images. Color measuring section 202 is positioned on the downstream side of reading section 210 in the conveying direction of sheet S, and outputs image information read thereby to reading control section 201.

Figure 3:
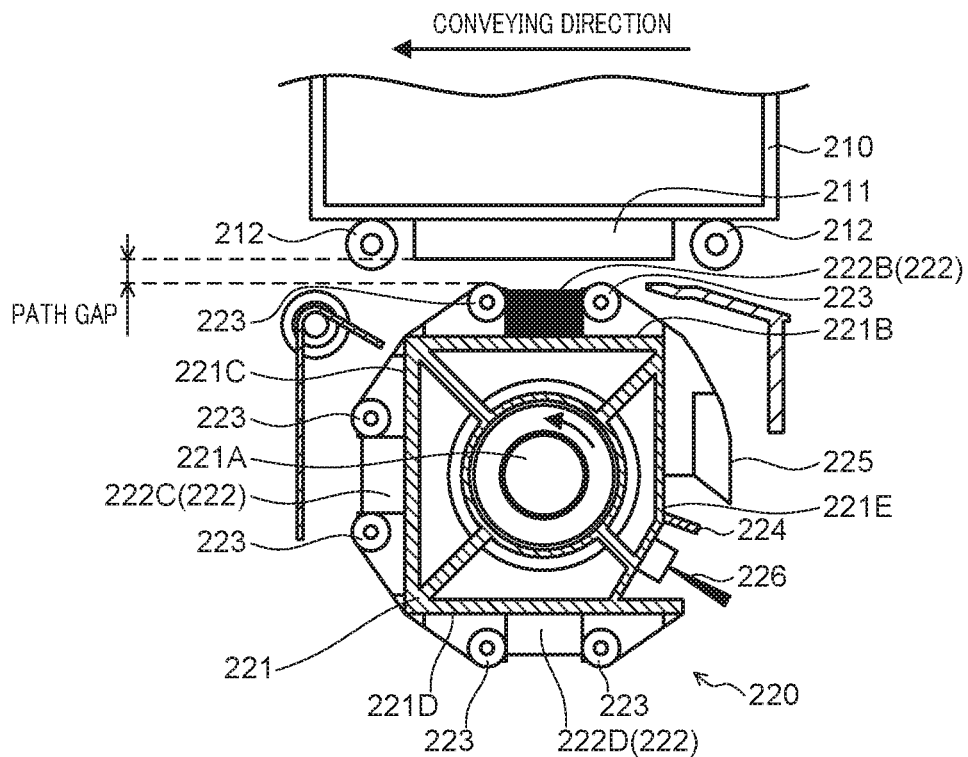
FIG. 3 illustrates the vicinity of a region between an opposing part and a reading section.

Reading section 210 is a scanner equipped with a CCD or CMOS optical image sensor, for example, that includes numerous regularly arranged reading elements and is configured to read the position and the density of an image formed on sheet S. Reading section 210 outputs the image information read thereby to reading control section 201. As illustrated in FIG. 3, reading section 210 includes transmission section 211 and sheet height restriction rollers 212.

Transmission section 211 is a member, such as dust-proof glass, that transmits light for reading images by reading section 210. Transmission section 211 is provided facing opposite to sheets S being conveyed in reading section 210.

Each sheet height restriction roller 212 is disposed on the upstream side and the downstream side of transmission section 211 in the conveying direction of sheet S (the direction from the right to the left in the Figure). Lower ends of sheet height restriction rollers 212 are positioned protruded downward from transmission section 211. By this configuration, sheet S and sheet height restriction rollers 212 come into contact when sheet S is conveyed to a position corresponding to transmission section 211, thereby restricting the height position of sheet S.

Opposing part 220 is disposed on the side opposite to transmission section 211 relative to the feeding path of sheet S, and includes body section 221, background portions 222, sheet height reference rollers 223, and guide portion 224.

Body section 221 is formed in nearly a square shape in the cross-sectional view, and configured to rotate around a specific shaft 221A which is fixed in an appropriate position of image reading apparatus 2. Accordingly, the height position of opposing part 220 is fixed relative to transmission section 211.

Shaft 221A of body section 221 is connected with a stepping motor. Under rotation control of body section 221 by reading control section 201, any one of first face 221B, second face 221C, third face 221D, or fourth face 221E, which constitutes body section 221, can be placed opposite to transmission section 211.

Opposing part 220 is stopped when any one of first face 221B, second face 221C, third face 221D, or fourth face 221E is placed opposite to transmission section 211. In this process, high stopping accuracy can be ensured by raising the reduction ratio of the stepping motor and thus enhancing resolution. Since opposing part 220 rotates around the rotation shaft, a constant distance from the rotation shaft to transmission section 211 is always maintained even if any face is placed opposite to transmission section 211. Accordingly, lowering in reading accuracy is avoided during switching of the faces that are placed opposite to transmission section 211.

In FIG. 3, first face 221B is the upper face of body section 221, second face 221C is the left face of body section 221, third face 221D is the lower face of body section 221, and fourth face 221E is the right face of body section 221.

Background portion 222 is a portion placed opposite to the rear side of sheet S whose image is read when reading operations of images are performed by reading section 210. Background portions 222 are each provided so as to protrude from first face 221B, second face 221C, and third face 221D.

Among background portions 222, background portion 222B provided on first face 221B is surface-coated with black color, and controlled to be positioned opposite to transmission section 211 when edges of sheet S are read by reading section 210.

Background portion 222C provided on second face 221C is surface-coated with white color, and controlled to be positioned opposite to transmission section 211 when absolute color values of images formed on sheets S are read.

Background portion 222D provided on third face 221D is not surface-coated with any specific color, and controlled to be positioned opposite to transmission section 211 when sheets are fed without performing reading operations by reading section 210.

Sheet height reference rollers 223 are members that form a gap with transmission section 211 in the feeding path of sheet S when placed opposite to transmission section 211. Sheet height reference rollers 223 are first gap-forming sections that form a first gap with transmission section 211 in a region opposite to transmission section 211, as well as restriction members that restrict the position of sheet S by coming into contact with sheet S which passes through the sheet feeding path. In the present specification, "a gap between transmission section 211 and a specific portion of opposing part 220" means a distance between the specific portion and transmission section 211 when the specific portion is positioned opposite to transmission section 211.

Two sheet height reference rollers 223 are each provided on first face 221B, second face 221C, and third face 221D. Specifically, sheet height reference rollers 223 are each provided to sandwich respective background portions 222 in the conveying direction of sheet S when being placed opposite to transmission section 211.

Sheet height reference rollers 223 are positioned so that the upper ends protrude upward from background portions 222. Such a configuration can narrow a path gap in the feeding path of sheet S, compared to a configuration in which sheet height reference rollers 223 are absent.

In the embodiment, the height of sheet S is restricted by the above-mentioned sheet height restriction rollers 212, whereas the path gap in the feeding path of sheet S can be narrowed by sheet height reference rollers 223. Such a configuration suppresses fluctuations in height of sheet S conveyed in the region of reading section 210, and thus reading accuracy of images which have been formed on sheets S can be enhanced.

For example, by setting a path gap, which is a gap between sheet height reference rollers 223 and transmission section 211, to about 1 to 2 mm, reading accuracy in which color difference $\Delta E00$ becomes 1.25 or smaller in average can be ensured in reading section 210.

Figure 4:
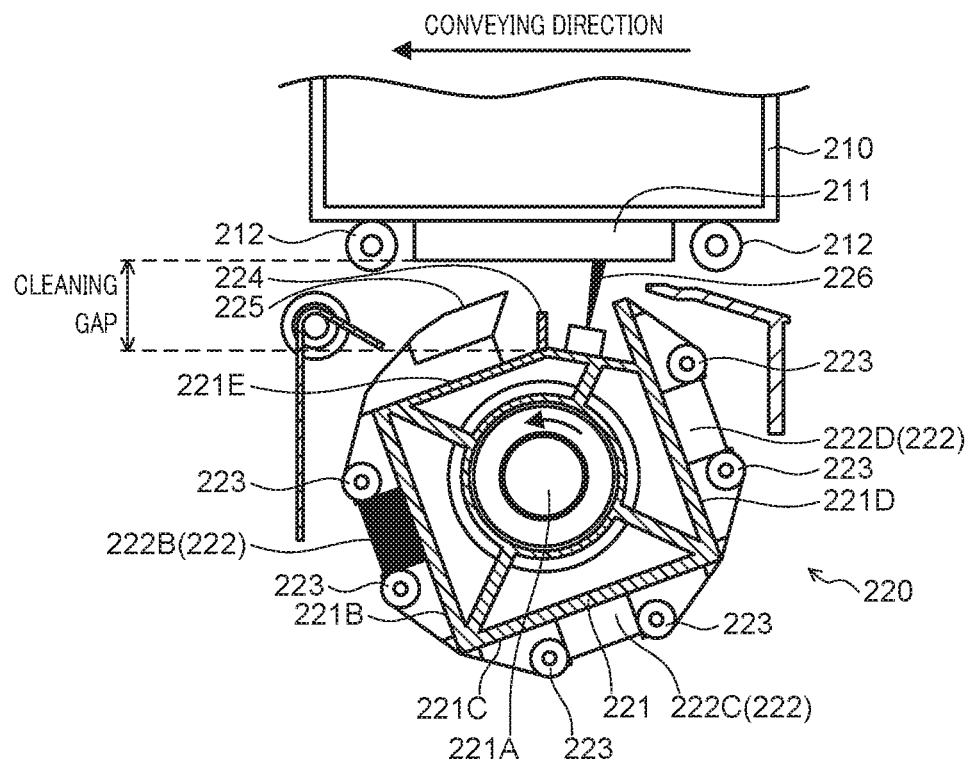
FIG. 4 illustrates the vicinity of the region between the opposing part and the reading section.

As illustrated in FIG. 4, guide portion 224 is a portion that guides a cleaning member, which is to be externally inserted into the apparatus, to a position opposite to transmission section 211, and is provided to protrude from fourth face 221E of body section 221. Specifically, since transmission section 211 is cleaned when no sheet is fed, the rotation of body section 221 is controlled so that fourth face 221E is positioned opposite to transmission section 211 when no sheet is fed.

In particular, body section 221 is set so that guide portion 224 is positioned corresponding to a position where a cleaning member is inserted into the apparatus (the position illustrated in FIG. 4) when no sheet is fed. Since neither background portion 222 nor sheet height reference roller 233 is provided, a gap between fourth face 221E and transmission section 211 becomes wider than the path gap when sheet height reference rollers 223 are placed opposite to transmission section 211 (see FIG. 3).

Accordingly, a cleaning gap in which transmission section 211 can be cleaned by a cleaning member is formed between transmission section 211 and fourth face 221E. Fourth face 221E is the above-mentioned second gap-forming section that forms a second gap, which is larger than the first gap.

Figure 5:
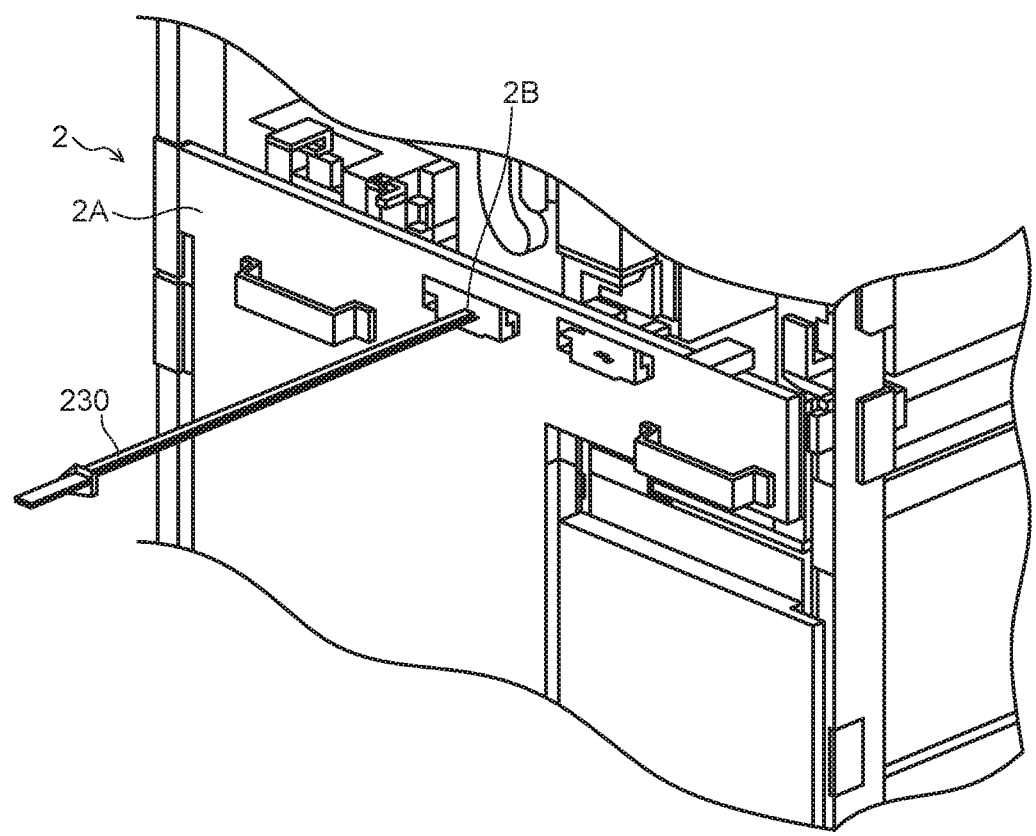
FIG. 5 illustrates a state in which a cleaning member is inserted into the apparatus.

Further, as illustrated in FIG. 5, hole 2B, into which cleaning member 230 long in the axial direction is to be inserted, is formed on side wall 2A of image reading apparatus 2. FIG. 5 illustrates a state in which a front door (not shown) of image reading apparatus 2 is open.

Figure 6:
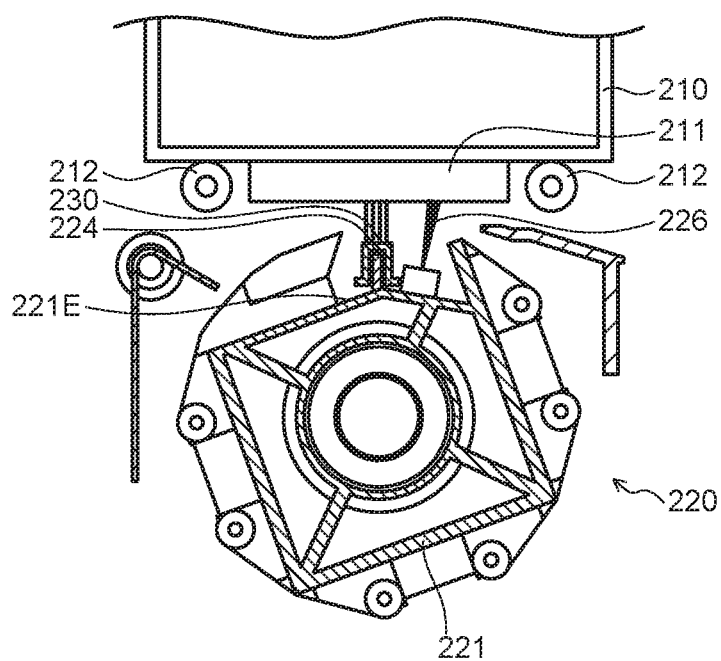
FIG. 6 illustrates the vicinity of the region between the opposing part and the reading section in a state in which the cleaning member is inserted.

When guide portion 224 is positioned as illustrated in FIG. 4 and cleaning member 230 is inserted from hole 2B, as illustrated in FIG. 6, cleaning member 230 is guided along guide portion 224 to a region opposite to transmission section 211. Cleaning is completed by pulling cleaning member 230 forward once cleaning member 230 has reached the back.

As in the above configuration, widening a gap between opposing part 220 and transmission section 211 can secure a gap for inserting cleaning member 230 into the apparatus, and thus transmission section 211 can be cleaned.

In the embodiment, reading control section 201 controls the rotation of opposing part 220 so that sheet height reference rollers 223 are positioned opposite to transmission section 211 when sheets are fed while fourth face 221E is positioned opposite to transmission section 211, as illustrated in FIG. 4 in more detail, when no sheet is fed. Such a configuration can ensure reading accuracy by reading section 210 and thus transmission section 211 provided in reading section 210 can be cleaned.

Meanwhile, if guide portion 224 is not positioned as illustrated in FIG. 4 when image reading apparatus 2 is stopped to clean transmission section 211, cleaning member 230 cannot be inserted into the apparatus and thus transmission section 211 cannot be cleaned. Further, if guide portion 224 is not positioned as illustrated in FIG. 4, the surrounding components could be damaged.

In the embodiment, however, guide portion 224 is placed in a position where cleaning member 230 is inserted into the apparatus when no sheet is fed. Accordingly, the position of opposing part 220 needs not to be adjusted during cleaning of transmission section 211, and consequently cleaning can be performed easily by cleaning member 230.

As illustrated in FIG. 4, corrector 225 and cleaning section 226 are provided in the vicinity of guide portion 224 on fourth face 221E.

Correction portion 225 has a white reference face for performing correction processing in reading section 210, such as gain correction that adjusts sensitivity of an element and shading correction that corrects uneven light quantity in an emission section. By providing correction section 225 on fourth face 221E and moving correction section 225 to a position opposite to transmission section 211 when no sheet is fed, correction processing in reading section 210 can be performed effectively.

Cleaning section 226 is a conductive brush, which is a cleaning member that can come into contact with transmission section 211, and is positioned on the upstream side of guide portion 224 in the rotation direction (counterclockwise direction in FIG. 4) of body section 221. Cleaning section 226 can automatically clean transmission section 211 by the rotation operation of body section 221. By performing the rotation operation of body section 221 a plurality of times, cleaning can be performed effectively by cleaning section 226.

Meanwhile, paper powder, dust, and the like generated during conveyance of sheet S are scattered depending on the airflow direction and/or airflow volume inside the apparatus. When paper powder, dust, and the like are scattered toward the upstream side of reading section 210 in the conveying direction of sheet S, such paper powder, dust, and the like could be conveyed back to reading section 210 when feeding of sheets is resumed.

For this reason, it is desirable to set the rotation direction of body section 221 in a direction going from the upstream side to the downstream side in the conveying direction of sheets S, i.e., only in the counterclockwise direction as illustrated. In such a setting, the airflow along the conveying direction of sheets S can be generated by the rotation of body section 221, thereby suppressing the movement of paper powder, dust, and the like toward the upstream side of reading section 210. Further, by providing cleaning section 226, paper powder and the like attached to transmission section 211 can be actively moved toward the downstream side in the conveying direction.

Since cleaning section 226 is positioned on the upstream side of guide portion 224, paper powder and the like attached to brush portion of cleaning section 226 can be beaten off when cleaning member 230 is inserted into the apparatus.

It is desirable to move cleaning section 226 to a non-contact position with transmission section 211 when cleaning by cleaning section 226 is not performed while no sheet is fed. This can prevent lying down of brush bristles in cleaning section 226.

Figure 7:
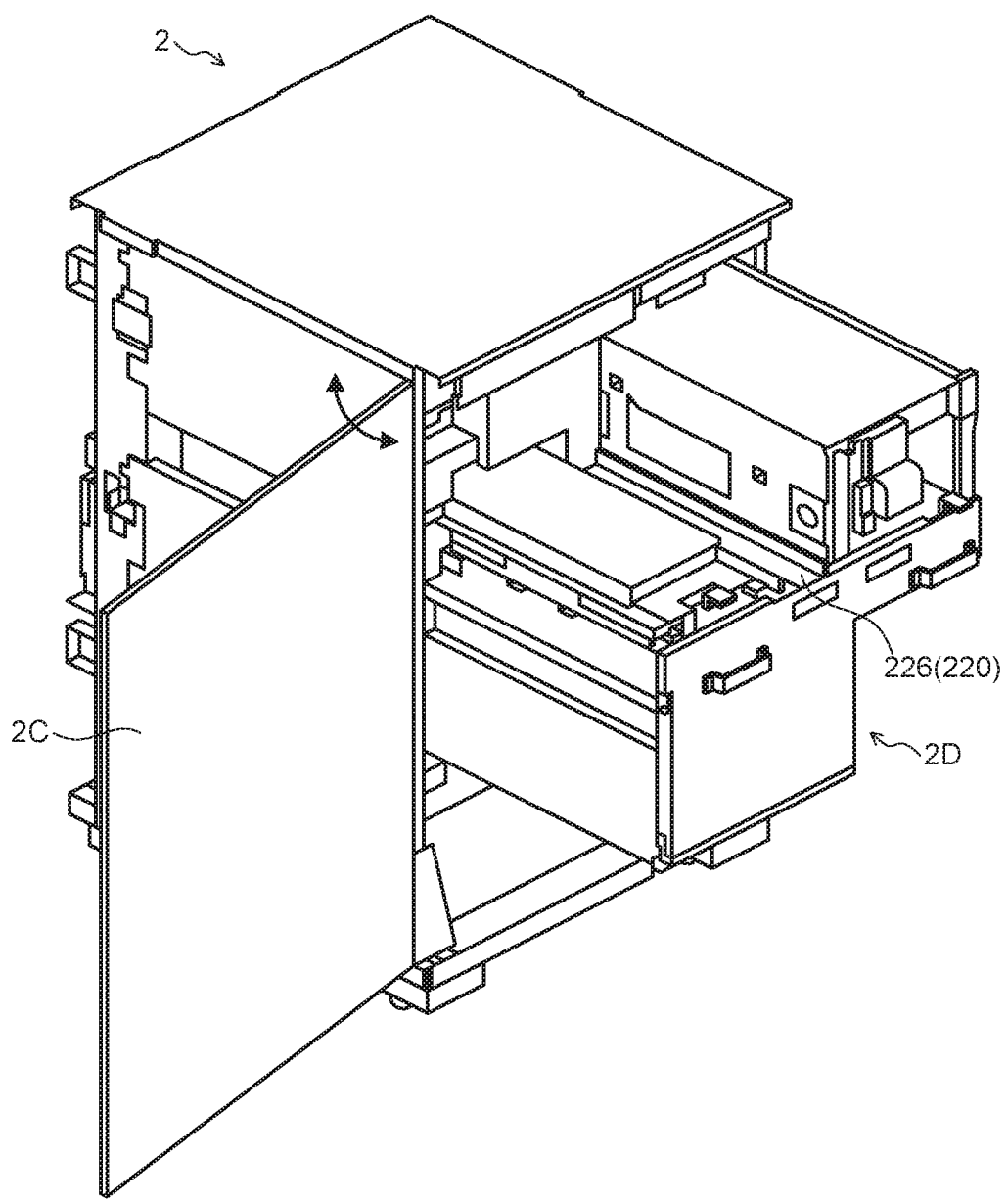
FIG. 7 illustrate a state in which a section including the opposing part is pulled out of the image reading apparatus.

Meanwhile, sheets S need to be kept removable from the inside of image reading apparatus 2 when a paper jam occurs in image reading apparatus 2. Accordingly, in the embodiment, as illustrated in FIG. 7, it is desirable that a lower portion of the sheet feeding path, i.e., conveyance base section 2D including opposing part 220, can be pulled out after front door 2C of image reading apparatus 2 is opened. By this configuration, paper jam processing can be performed easily when a paper jam occurs in image reading apparatus 2.

In order to ensure the positional accuracy, reading section 210 is positioned and fixed inside image reading apparatus 2, and thus is not coupled with the pulling operation of conveyance base section 2D.

Further, it is desirable that cleaning section 226 is configured to be exposed outside when conveyance base section 2D including opposing part 220 is pulled out of image reading apparatus 2. By this configuration, users can easily and visually confirm degree of soiling in the brush portion of cleaning section 226.

According to the embodiment configured as above, transmission section 211 provided in reading section 210 can be cleaned while reading accuracy by reading section 210 is ensured.

Further, in the embodiment, fluctuations in height of sheets S in the sheet feeding path can be suppressed since opposing part 220 is fixed by shaft 221A relative to transmission section 211. Accordingly, reading accuracy in reading section 210 can be enhanced.

Figure 8:
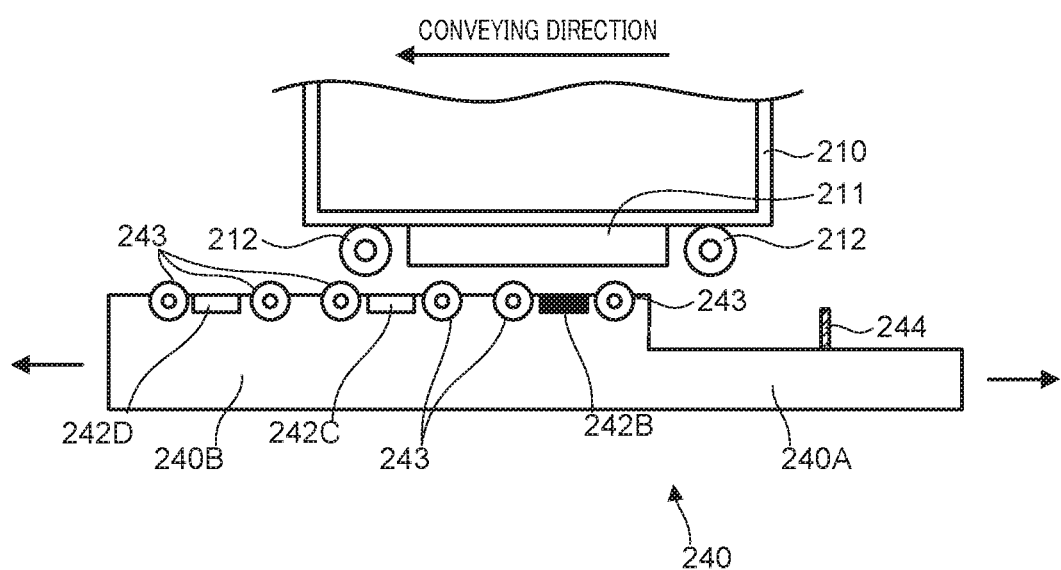
FIG. 8 illustrates the vicinity of a region between an opposing part and a reading section according to a Modification.

In the above embodiment, opposing part 220 is configured to rotate, but the present invention is not limited to this. As illustrated in FIG. 8, opposing part 240 may be configured to move in the horizontal direction, which is orthogonal to the opposing direction to transmission section 211.

Such opposing part 240 is formed to extend in the conveying direction of sheet S and is configured to be movable in the conveying direction of sheet S. Opposing part 240 includes first section 240A and second section 240B.

First section 240A is a section that forms a gap in which transmission section 211 can be cleaned by a cleaning member. In the embodiment, first section 240A is a second gap-forming section.

Guide portion 244 for guiding a cleaning member, which is to be externally inserted into the apparatus, to a position opposite to transmission section 211 is provided in first section 240A.

Second section 240B is a section that forms a gap with transmission section 211 in the feeding path of sheet S.

Second section 240B is positioned on the downstream side of first section 240A in the conveying direction and is formed to have a higher position of the surface height than first section 240A.

In second section 240B, background portion 242B surface-coated with dark color, such as black color, background portion 242C surface-coated with white color, and background portion 242D without surface coating with any specific color are provided aligning in the conveying direction. For each background portion 242B, 242C, or 242D, two opposing section rollers 243 are provided to sandwich respective background sections 242B, 242C, and 242D. In the embodiment, each opposing section roller 243 provided in second section 240B is a restriction member that restricts the position of sheet S, as well as a first gap-forming section.

First section 240A and second section 240B can be placed opposite to transmission section 211 by the movement of opposing part 240.

In opposing part 240 configured as above, a gap between first section 240A and transmission section 211 when first section 240A is placed opposite to transmission section 211 becomes wider than a gap between opposing section rollers 243 and transmission section 211 when second section 240B is placed opposite to transmission section 211.

By placing any of background portion 242B, 242C, or 242D of second section 240B opposite to transmission section 211 and thus narrowing the sheet feeding path when sheets are fed, reading accuracy in reading section 210 can be enhanced. Meanwhile, by placing first section 240A opposite to transmission section 211 when no sheet is fed, a cleaning member can be easily inserted for cleaning transmission section 211. In this configuration, transmission section 211 provided in reading section 210 can also be cleaned while reading accuracy by reading section 210 is ensured.

In the configuration illustrated in FIG. 8, compared to the configuration illustrated in FIG. 3, for example, relatively thin members can be used due to its configuration in which opposing part 240 moves in the horizontal direction. The height of image reading apparatus 2 can thus be lowered. Meanwhile, the bottom surface of opposing part 240 as a reference face is in contact with a rail, and thus a distance from reading section 210 to the reference face in a region opposite to reading section 210 is kept constant regardless of the movement of opposing part 240. Accordingly, lowering in reading accuracy can be avoided due to switching of the faces that are placed opposite to transmission section 211.

In the configuration illustrated in FIG. 8, opposing part 240 may also be configured to move in the width direction of sheet S. From a viewpoint of narrowing the width of image reading apparatus 2, however, it is desirable that opposing part 240 is configured to move in the conveying direction of sheet S.

In the above embodiment, guide portion 224 for guiding cleaning member 230 is provided. The present invention, however, is not limited to this. No guide portion 224 may be provided as long as cleaning section 226 is provided. Conversely, no cleaning section 226 may be provided as long as guide portion 224 is provided in opposing part 220.

In the above embodiment, reading section 210 is provided inside image reading apparatus 2, which is a separate apparatus from image forming apparatus 1. The present invention, however, is not limited to this, and reading section 210 may be provided inside image forming apparatus 1. In this case, control section 101 may be configured to perform rotation control of opposing part 220 in the above embodiment.

The aforementioned embodiments just describe examples of embodiments for practicing the present invention, and should not be construed as limiting the technical scope of the present invention in any way. Variations are possible without departing from the spirit or scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:
    a reader that reads an image formed on a sheet being conveyed along a sheet feeding path;
    a transmitter that is provided facing each of the reader and the sheet feeding path, and that transmits light;
    an opposing part that is placed opposite to the transmitter via the sheet feeding path;
    the opposing part includes a plurality of opposing regions and the opposing part is configured such that each of the opposing regions can be selected to face the transmitter;
    each of the opposing regions of the opposing part includes a respective plurality of restrictors, wherein the respective plurality of restrictors for the opposing region that is facing the sheet feeding path restricts a position of the sheet by coming into contact with the sheet when the sheet passes through the sheet feeding path; and
    a hardware processor configured to change which opposing region is opposing to the transmitter, wherein
    the plurality of restrictors for each of the plurality of opposing regions are configured to move in accordance with the change of the opposing region; and
    when the image is read by the reader, one of the plurality of restrictors is positioned on an upstream side from a reading region which is read by the reader in the sheet feeding path and another of the plurality of restrictors is positioned on a downstream side from the reading region in the sheet feeding path.

2. The image reading apparatus according to claim 1, wherein:
    the opposing part includes a guide for guiding a cleaner that is to be externally inserted into the apparatus; and
    the hardware processor is configured to change the opposing region such that the guide is opposite to the transmitter.

3. The image reading apparatus according to claim 2, wherein the guide is configured to contact with the transmitter when the cleaning member is inserted.

4. The image reading apparatus according to claim 1, wherein the opposing part rotates around a shaft fixed in the image reading apparatus when the opposing region is changed.

5. The image reading apparatus according to claim 4, wherein the opposing part rotates in a same direction as a conveying direction of the sheet in the opposing region.

6. The image reading apparatus according to claim 1, wherein the opposing part moves along a direction parallel to a conveying direction of the sheet in the opposing region when the opposing region is changed.

7. The image reading apparatus according to claim 1, wherein:
   a cleaner that is capable of coming into contact with the transmitter is provided in the opposing part; and
   the hardware processor is configured to change the opposing region such that the cleaner contacts with the transmitter when the image is not read by the reader.

8. The image reading apparatus according to claim 7, wherein:
   the opposing part is provided so as to be pulled out of the image reading apparatus; and
   the cleaner is arranged so as to be exposed outside when the opposing part is pulled out of the image reading apparatus.

9. The image reading apparatus according to claim 1, wherein a dark color portion is provided between the plurality of restrictors for at least one of the opposing regions.

10. The image reading apparatus according to claim 1, wherein a white color portion is provided between the plurality of restrictors for at least one of the opposing regions.

11. The image reading apparatus according to claim 1, wherein the opposing part includes a corrector for performing correction processing of the reader.

12. An image forming system comprising:
   a reader that reads an image formed on a sheet being conveyed along a sheet feeding path;
   a transmitter that is provided facing each of the reader and the sheet feeding path, and that transmits light;
   an opposing part that is placed opposite to the transmitter via the sheet feeding path;
   the opposing part includes a plurality of opposing regions and the opposing part is configured such that each of the opposing regions can be selected to face the transmitter;
   each of the opposing regions of the opposing part includes a respective plurality of restrictors, wherein the respective plurality of restrictors for the opposing region that is facing the sheet feeding path restricts a position of the sheet by coming into contact with the sheet when the sheet passes through the sheet feeding path; and
   a hardware processor configured to change which opposing region is opposing to the transmitter, wherein
   the plurality of restrictors for each of the plurality of opposing regions are configured to move in accordance with the change of the opposing region; and
   when the image is read by the reader, one of the plurality of restrictors is positioned on an upstream side from a reading region which is read by the reader in the sheet feeding path and another of the plurality of restrictors is positioned on a downstream side from the reading region in the sheet feeding path.

* * * * *